(12) United States Patent
Hui et al.

(10) Patent No.: US 6,999,688 B1
(45) Date of Patent: Feb. 14, 2006

(54) OPTICAL SYSTEMS WITH DIVERSITY DETECTION

(75) Inventors: Rongqing Hui, Leneza, KS (US); Christopher T. Allen, Independence, MO (US); Kenneth Robert Demarest, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 662 days.

(21) Appl. No.: 10/027,966

(22) Filed: Dec. 20, 2001

(51) Int. Cl.
*H04B 10/06* (2006.01)

(52) U.S. Cl. .................. 398/205; 398/206; 398/209

(58) Field of Classification Search ............ 398/74–76, 398/81, 135, 147, 202–214, 195, 93, 123, 398/137, 159, 181; 359/483, 495
See application file for complete search history.

(56) References Cited

U.S. PATENT DOCUMENTS

| | | | | |
|---|---|---|---|---|
| 3,435,229 A | * | 3/1969 | Buhrer | 398/65 |
| 4,972,515 A | * | 11/1990 | Shibutani | 398/205 |
| 5,138,476 A | * | 8/1992 | Shibutani | 398/204 |
| 2002/0030877 A1 | * | 3/2002 | Way et al. | 359/183 |

OTHER PUBLICATIONS

Lima, A.O.; Lima, I.T., Jr.; Adali, T.; Menyuk, C.R.; PMD mitigation using diversity detection; Ultralong Haul DWDM Transmission and Networking/WDM Components, 2001 Digest of the LEOS Summer Topical Meetings, Jul. 30-Aug. 1, 2001; pp. 17-18.*

Phillips, Mary R., "Lightwave Analog Video Transmission" in Optical Fiber Telecommunications IIIA. Academic Press, 1997.

Hill, Paul M., "A 20-Channel Optical Communication system Using Subcarrier Multiplexing for the Transmission of Digital Video Signals" Journal of Lightwave Technology, vol. 8, No. 4, Apr. 1990.

Adamczyk, O. H., "Statistics of PMD-induced power fading for double sideband and single sideband subcarrier-multiplexed signals" Department of Electrical Engineering, University of Southern California, Los Angeles, CA.

Ho, Keang-Po, "Hybrid Wavelength-Division-Multiplexing Systems for High-Capacity Digital and Analog Video Trunking Applications" IEEE Photonics Technology Letters, vol. 10, No. 2, Feb. 1998.

Takahashi, T., "Automatic compensation technique for timewise fluctuating polarisation mode dispersion in in-line amplifier systems," Electronics Letters, vol. 30 No. 4, Feb. 17, 1994.

(Continued)

*Primary Examiner*—Jason Chan
*Assistant Examiner*—Quan-Zhen Wang

(57) ABSTRACT

A receiver system processes a received optical signal that carries user information. The receiver system includes a splitter, a first converter, a second converter, and a detection system. The splitter splits the received optical signal based on polarization into a first optical signal and a second optical signal. The first converter converts the first optical signal into a corresponding first electrical signal. The second converter also converts the second optical signal into a corresponding second electrical signal. The detection system applies radio frequency detection to the first electrical signal to generate a third electrical signal. The detection system applies radio frequency detection to the second electrical signal to generate a fourth electrical signal. The detection system then combines the third electrical signal and the fourth electrical signal to form a fifth electrical signal that carries the user information.

14 Claims, 7 Drawing Sheets

OTHER PUBLICATIONS

Pua, Hok Yong, "An Adaptive First-Order Polarization-Mode Dispersion Compensation System Aided by Polarization Scrambling: Theory and Demonstration" Journal of Lightwave Technology, vol. 18, No. 6, Jun. 2000 IEEE.

Derickson, D. "Fiber Optic Test and Measurement" Hewlett-Packard Professional Books, Prentice Hall PTR, Upper Saddle River, NJ 1998.

Kazovsky, Leonid, "Optical Fiber Communication Systems" Artech House, Inc., Norwood, MA 1996.

* cited by examiner

OPTICAL SYSTEMS WITH DIVERSITY DETECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a communication system for processing received optical signals that carry user information.

2. Description of the Prior Art

Transmission technologies such as multiplexing are used to increase the bandwidth provided by optical fibers. One transmission technology called time division multiplexing (TDM) interleaves multiple channels or signals into one optical signal. Another transmission technology called wavelength division multiplexing (WDM) transmits multiple signals at different wavelengths, where low data rates are used on each wavelength. Commercial WDM systems are limited by channel spacing of about 50 GHz due to selectivity of optical filters and limitations in the wavelength stability of semiconductor lasers.

Another transmission technology called sub-carrier multiplexing (SCM) multiplexes multiple signals in the radio frequency (RF) domain and transmits on a single spectral carrier. In an SCM system, the receiver generates a composite electrical signal from the heterdyne beating between the carrier and the sub-carrier. SCM is advantageous because microwave devices are more mature than optical devices. Some of these transmission technologies are combined such as WDM/SCM optical systems to provide even greater transmission capacity.

Optical system that utilize these transmission technologies experience signal degradation such as non-linear crosstalk, chromatic dispersion, and polarization mode dispersion (PMD) especially with higher data rates and long distance transmissions. Optical systems with data rates of 10 Gb/s and higher require precise dispersion compensation and careful link engineering.

PMD results from birefringent properties in the optical fiber, where the material in the optical fiber displays two different indices of refraction due to asymmetries in the optical fiber. PMD varies in time with ambient temperature, fiber movement, and mechanical stress on the fibers. Thus, compensating for PMD can be difficult because of the time varying nature and randomness of PMD. PMD is measured like a vector quantity, where a differential group delay (DGD) is the magnitude of the vector and the principal state of polarization (PSP) are the direction. There are two PSPs associated with PMD. The two PSPs propagate at slightly different velocities with the distribution of signal power varying with time. The generally acceptable limit for DGD is about 15% of the bit time for the non-return-to-zero (NRZ) modulation format.

FIG. 1 depicts a PMD compensation system 100 in the prior art. The transmitter 102 transmits an optical signal to the polarization controller 106 via the optic fiber 104. The polarization controller 106 aligns polarization of the optical signal based on feedback links 126 and 128 from the compensation algorithm 124. The polarization beam splitter 110 then splits the optical signal by the two PSPs of the optical fiber into link 114 and the optical delay line 112. The optical delay line 112 is tunable and introduces a DGD that is equal to the instantaneous DGD from the PMD. After the two split optical signals are combined, the photodetector 116 converts the optical signal into a corresponding electrical signal. The bandpass filter 118, the square law detector 120, and the low pass filter 122 then modify the electrical signal. The compensation algorithm 124 then performs an algorithm to determine how much DGD to introduce into the optical signal and how to control the polarization controller 106.

One problem with the PMD compensation system 100 is the optical delay line 112. The optical delay line 112 uses a mechanical means to cover a sufficient DGD range. For example, an optical system with a 200 ps DGD requires a 60 mm dynamic range of physical delay for the tunable optical delay line, which is accomplished by motorized machines. One limitation of this tunable optical delay line with a motorized machine is the speed of tuning, which is inversely proportional to the tuning range. The optical delay line is slow and also bulky. Another problem is the long term reliability of mechanical moving parts of the optical delay line, which perform continuous adjustment in an operational optical system.

In another prior solution, two photodetectors convert the optical signals from the splitter into two electrical signals. An RF delay line delays one of the electrical signals similar to the optical delay line in FIG. 1 except this RF delay line is in the electrical domain. Unfortunately, this prior solution also experiences the same problems of the optical delay line such as reliability with the RF delay line.

In an optical SCM system, the data rate carried by each RF carrier is relatively low compared to a conventional TDM system. Therefore, PMD-induced signal distortion is not considered significant because the width of the data pulse is long. However, PMD-induced signal fading in SCM systems depends on the frequency of the sub-carrier, which is typically higher than the data rate.

SUMMARY OF THE INVENTION

The invention helps solve the above problems by systems and methods that process a received optical signal that carries user information. A receiver system includes a splitter, a first converter, a second converter, and a detection system. The splitter splits the received optical signal based on polarization into a first optical signal and a second optical signal. The first converter converts the first optical signal into a corresponding first electrical signal. The second converter also converts the second optical signal into a corresponding second electrical signal. The detection system applies radio frequency detection to the first electrical signal to generate a third electrical signal. The detection system applies radio frequency detection to the second electrical signal to generate a fourth electrical signal. The detection system then combines the third electrical signal and the fourth electrical signal to form a fifth electrical signal that carries the user information.

In one embodiment, the first optical signal and the second optical signal are aligned with the principal states of polarization of an optic fiber. In some embodiments, the receiver system includes a polarization controller connected to the splitter and configured to align polarizations of the received optical signal with a principal axis of the splitter. In some embodiments, the detection system generates a sixth electrical signal and mixes the sixth electrical signal with the first electrical signal. In some embodiments, the detection system applies a bandpass filter to the first electrical signal and applies a square law detector to the first electrical signal.

The receiver system advantageously reduces dispersion effects such as polarization mode dispersion by applying radio frequency detection. The radio frequency detection is advantageous over the optical delay line and RF delay line based on the absence of mechanical parts, which thus provides greater reliability. The detection system can then use electrical circuits to apply radio frequency detection, which is small in size, reliable, and integratable.

BRIEF DESCRIPTION OF THE DRAWINGS

The same reference number represents the same element on all drawings.

DETAILED DESCRIPTION OF THE PREFERRED EMBODIMENT

Figure 1:
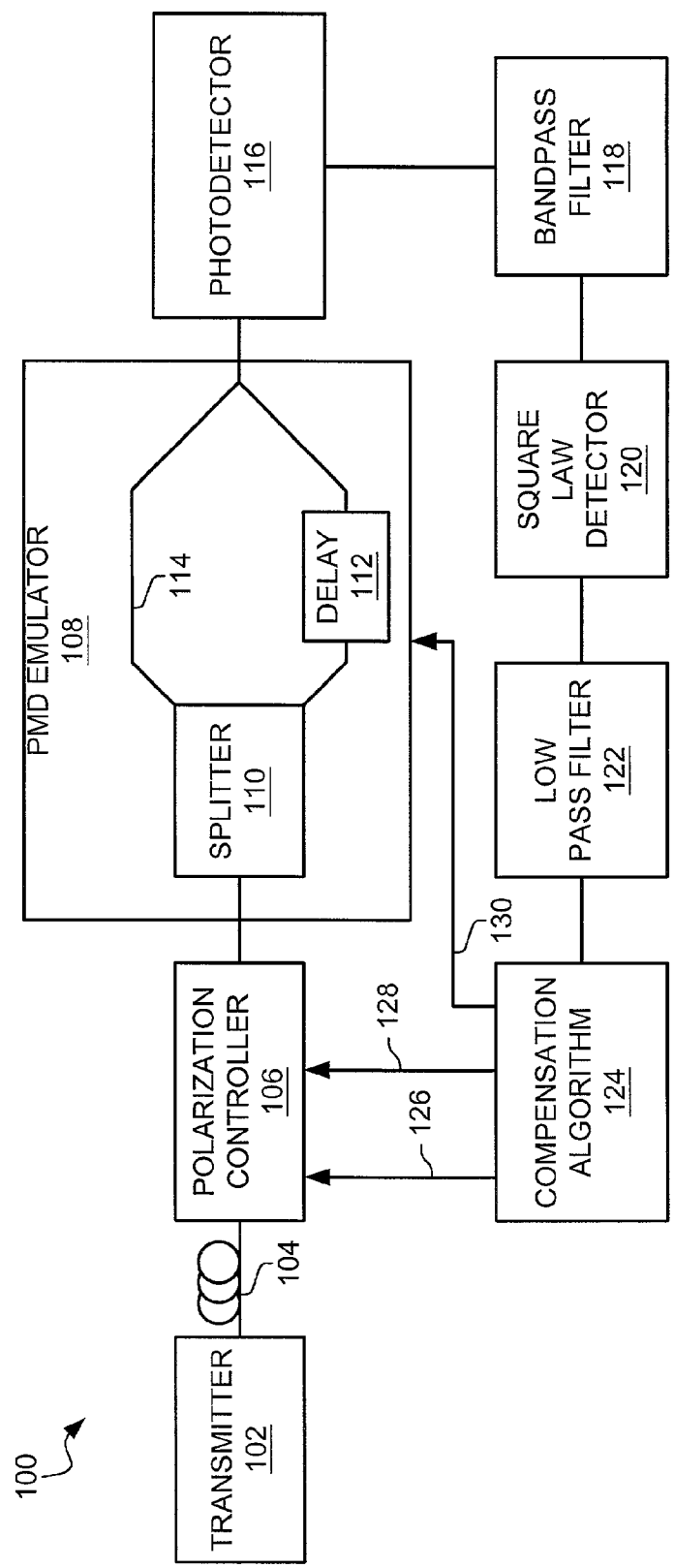
FIG. 1 is a block diagram of a polarization mode dispersion compensation system in the prior art.
Figure 2:
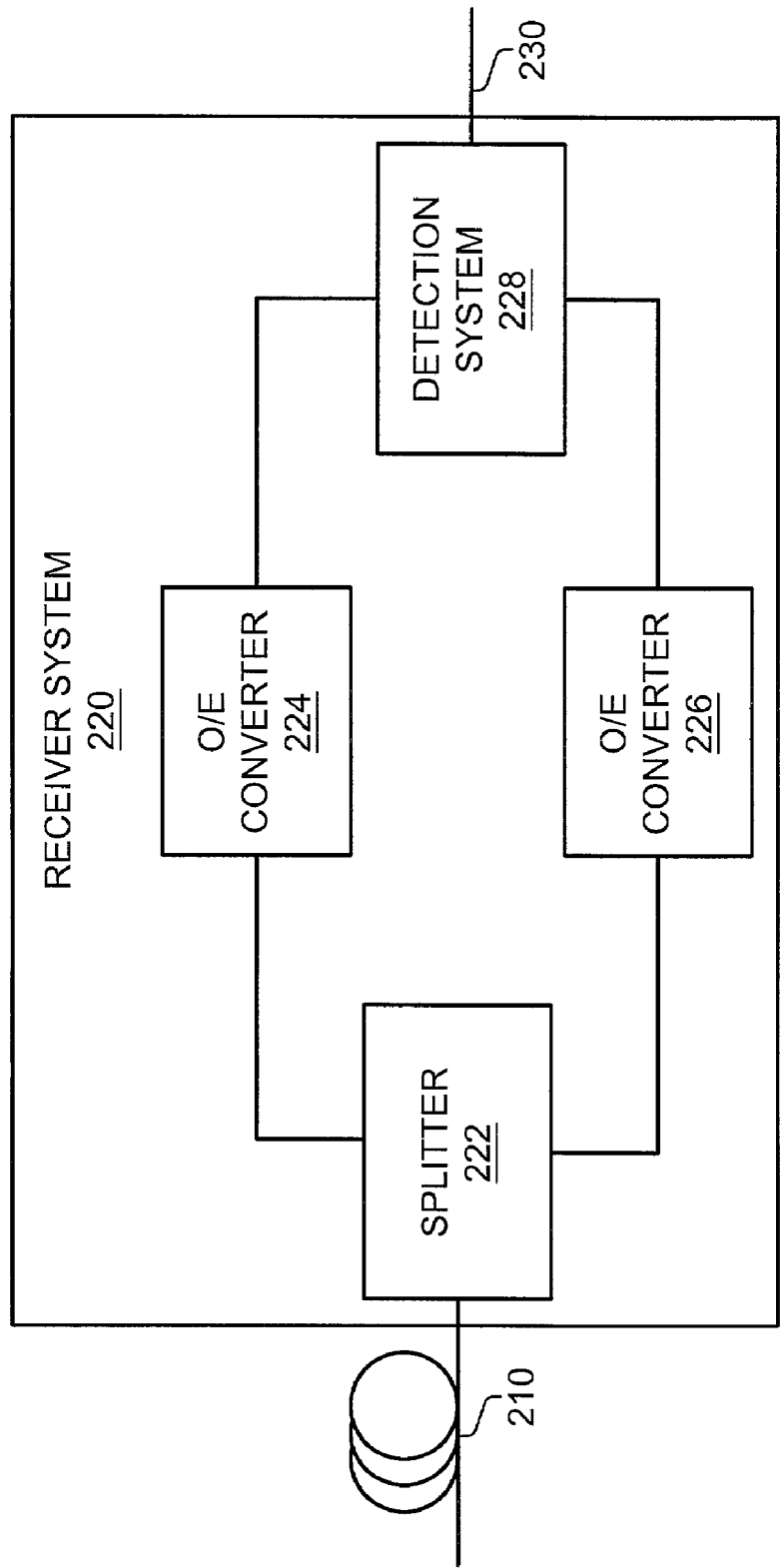
FIG. 2 is a block diagram of a receiver system in an example of the invention.
Figure 3:
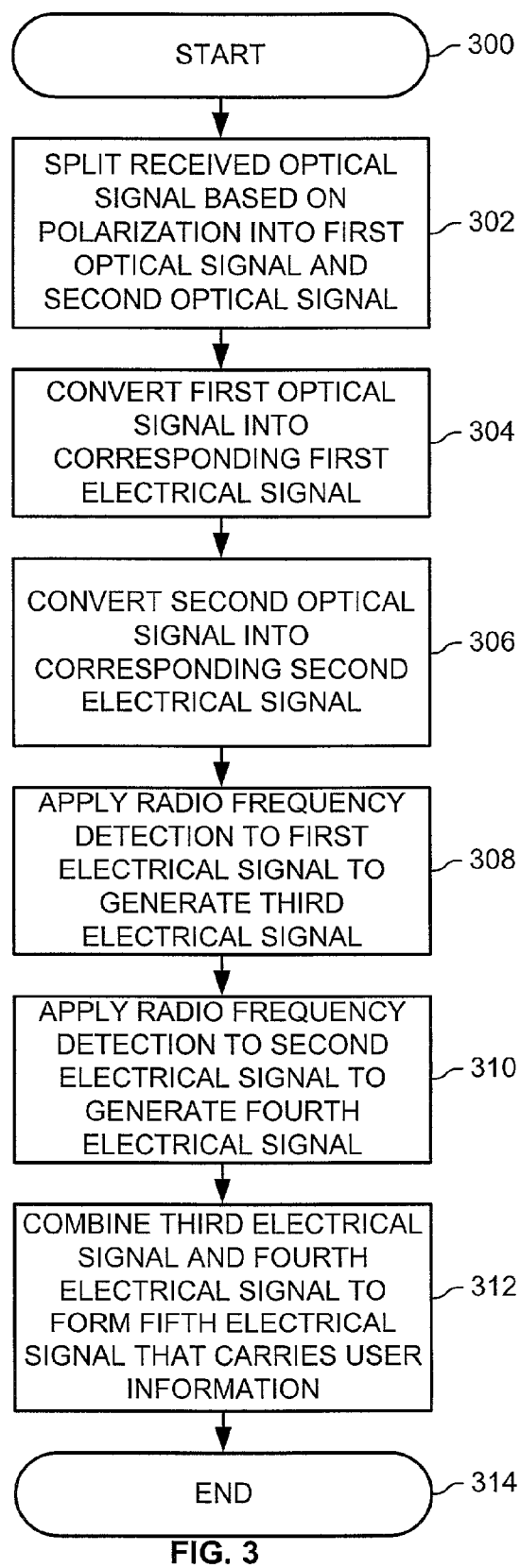
FIG. 3 is a flow chart for the receiver system in an example of the invention.

Receiver System—FIGS. 2–3

FIG. 2 depicts a block diagram of a receiver system 220 in an example of the invention. The receiver system 220 comprises a splitter 222, an optical to electrical (O/E) converter 224, an O/E converter 226, and a detection system 228. An optic fiber link 210 is connected to the splitter 222. The splitter 222 is connected to the O/E converter 224 and the O/E converter 226. The detection system 228 is connected to the O/E converter 224, the O/E converter 226, and an output link 230.

The splitter 222 is any system or device configured to split a received optical signal based on polarization into a first optical signal and a second optical signal. One example of the splitter 222 is a polarization beam splitter. The O/E converter 224 and the O/E converter 226 are any system or device configured to convert an optical signal into an electrical signal. Some examples of the O/E converter 224 and the O/E converter 226 are photodiodes. The detection system 228 is any device or system configured to apply radio frequency (RF) detection to the first electrical signal to generate a third electrical signal, apply RF detection to the second electrical signal to generate a fourth electrical signal, and combine the third electrical signal and the fourth electrical signal to form a fifth electrical signal that carries the user information. Some examples of the detection system 228 includes multipliers, local oscillators, phase shifters, bandpass filters, and square law detectors. The user information is any data or information that is carried over a signal. RF detection is any method or process that processes signals in the RF range to interpret, decode or demodulate. Some examples of RF detection include coherent RF detection and incoherent RF detection as shown below.

FIG. 3 depicts a flow chart for the receiver system 220 in an example of the invention. FIG. 3 begins in step 300. In step 302, the splitter 222 splits the received optical signal based on polarization into a first optical signal and a second optical signal. In step 304, the O/E converter 224 converts the first optical signal into a corresponding first electrical signal. In step 306, the O/E converter 226 converts the second optical signal into a corresponding second electrical signal. In step 308, the detection system 228 then applies radio frequency detection to the first electrical signal to generate a third electrical signal. In step 310, the detection system 228 applies radio frequency detection to the second electrical signal to generate a fourth electrical signal. In some embodiments, the RF carrier is removed by RF detection in step 308 and 310. In step 312, the detection system 228 then combines the third electrical signal and the fourth electrical signal to form a fifth electrical signal that carries the user information. FIG. 3 ends in step 314.

The receiver system 220 advantageously reduces dispersion effects such as polarization mode dispersion by applying radio frequency detection. The radio frequency detection is advantageous over the optical delay line and RF delay line based on the absence of mechanical parts, which thus provides greater reliability. The detection system 228 can then use electrical circuits to apply radio frequency detection, which is small in size, reliable, and integratable.

Communication System with RF Detection—FIGS. 4–7

FIGS. 4–7 and the following description depict specific examples of a communication system to teach those skilled in the art how to make and use the best mode of the invention. For the purpose of teaching inventive principles, some conventional aspects of the communication system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 4:
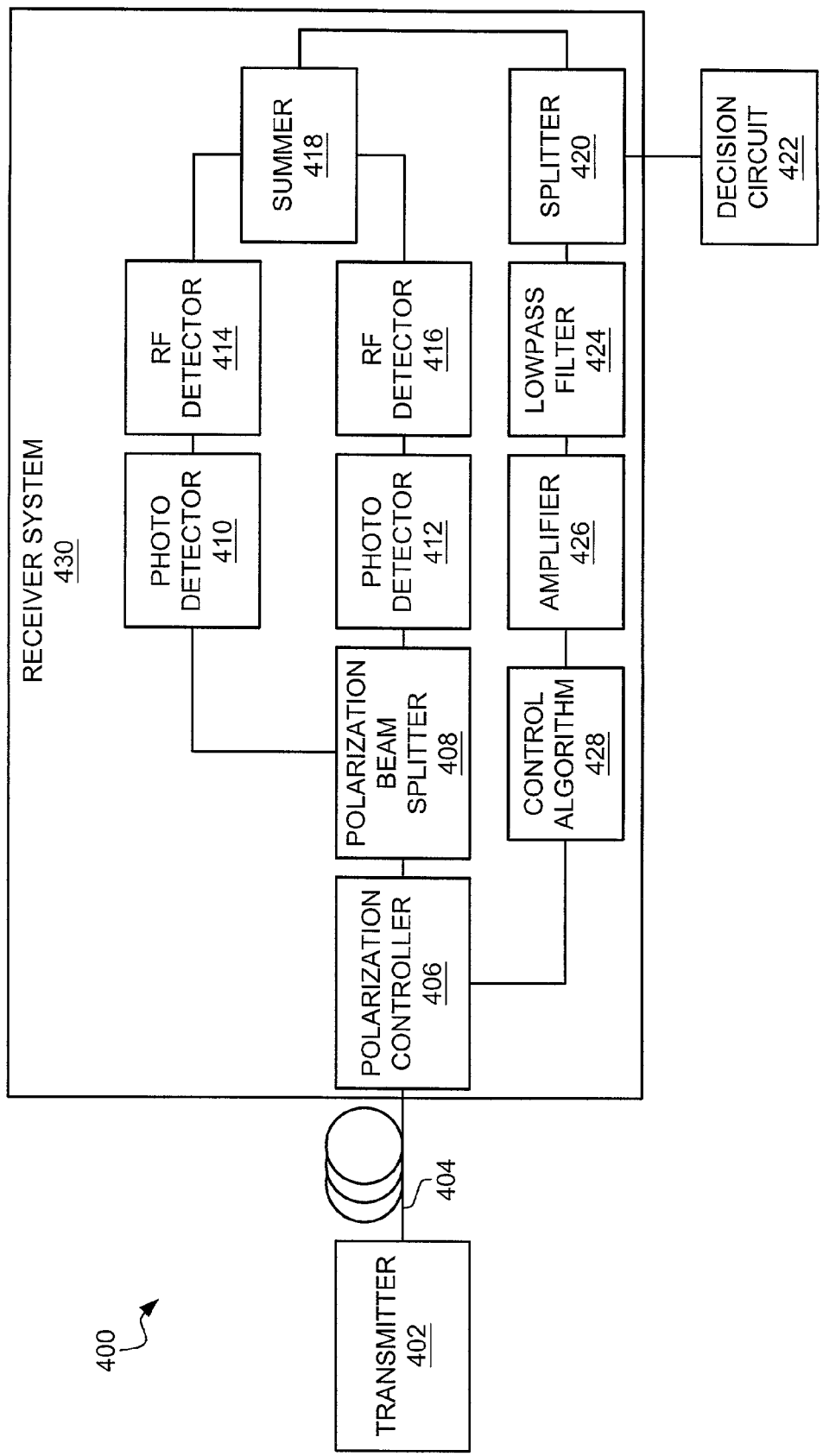
FIG. 4 is a block diagram of a communication system with a receiver system in an example of the invention.

FIG. 4 depicts a block diagram of a communication system 400 with a receiver system 430 in an example of the invention. The communication system 400 includes a transmitter 402, an optic fiber link 404, a receiver system 430, and a decision circuit 422. The receiver system 430 includes a polarization controller 406, a polarization beam splitter 408, a photodetector 410, a photodetector 412, an RF detector 414, an RF detector 416, a summer 418, a splitter 420, a lowpass filter 424, an amplifier 426, and a control algorithm 428.

The transmitter 402 is connected to the polarization controller 406 via the optic fiber link 404. The polarization controller 406 is connected to the polarization beam splitter 408 and the control algorithm 428. The polarization beam splitter 408 is connected to the photodetector 410 and the photodetector 412. The photodetector 410 is connected to the RF detector 414. The photodector 412 is connected to the RF detector 416. The RF detector 414 and the RF detector 416 are connected to the summer 418. The summer 418 is connected to the splitter 420. The splitter 420 is connected the decision circuit 422 and the lowpass filter 424. The low pass filter 424 is connected to the amplifier 426. The amplifier 426 is connected to the control algorithm 428.

The transmitter 402 is any conventional transmitter configured to transmit optical signals. The optic fiber link 404 is any conventional optic fiber. In some embodiments, the optic fiber link 404 includes other optical devices such as amplifiers and optical add/drop multiplexers. The polarization controller 406 is any conventional polarization controller configured to align polarization of optical signal based on instructions from the control algorithm 428. The polarization beam splitter 408 is a conventional polarization beam splitter configured to split a received optical signal based on polarization into a first optical signal and a second optical signal. The photodetector 410 and the photodetector 414 are conventional photodetectors configured to convert optical signals into electrical signals. The summer 418 is a conventional summer configured to sum two electrical signals into one electrical signal. The splitter 420 is a conventional splitter configured to split one electrical signal into two electrical signals.

The decision circuit 422 is any system, device or circuit configured to process an electrical signal to extract the user information from the electrical signal. The lowpass filter 424 is a conventional low pass filter. The amplifier 426 is a conventional amplifier. The control algorithm 428 is a system or device configured to perform an algorithm to determine how to control the polarization controller 406.

In operation, the transmitter 402 transmits an optical signal that carries user information to the polarization controller 406. The polarization controller 406 aligns the polarizations of the received optical signal with the principle axis of the polarization beam splitter 408 based on control instructions from the control algorithm 428. The polarization beam splitter 408 splits the received optical signal into a first optical signal and a second optical signal. In this embodiment, the polarization controller 406 and the polarization beam splitter 408 provide polarization diversity where the first optical signal and the second optical signal are aligned with the two PSPs. In this embodiment, PMD causes a relative time delay between the first optical signal and the second optical signal.

The photodetector 410 then converts the first optical signal into the first electrical signal. The photodetector 412 also converts the second optical signal into the second electrical signal. The RF detector 414 then applies RF detection to the first electrical signal to generate a third electrical signal. Some examples of RF detection are coherent RF detection and incoherent RF detection are discussed below. The RF detector 414 then applies RF detection to the second electrical signal to generate a fourth electrical signal. In some embodiments, the RF carrier is removed by RF detection.

The summer 418 then sums the third electrical signal and the fourth electrical signal into a fifth electrical signal that carries the user information. The splitter 420 then splits the fifth electrical signal into two electrical signals. The decision circuit 422 then processes one of the electrical signals to decode, interpret, or demodulate the user information from the electrical signal. The lowpass filter 424 filters the other electrical signal. The amplifier 426 amplifies the electrical signal. The control algorithm 428 then processes the electrical signal to generate control instructions for the polarization controller. In some embodiments, the control algorithm 428 processes the electrical signal to generate control instructions for the polarization controller 406 that indicate the two principal states of polarization. In some embodiments, the control algorithm 428 processes the electrical signal to generate control instructions for the RF detectors 414 and 416 that indicate the differential group delay.

Figure 5:
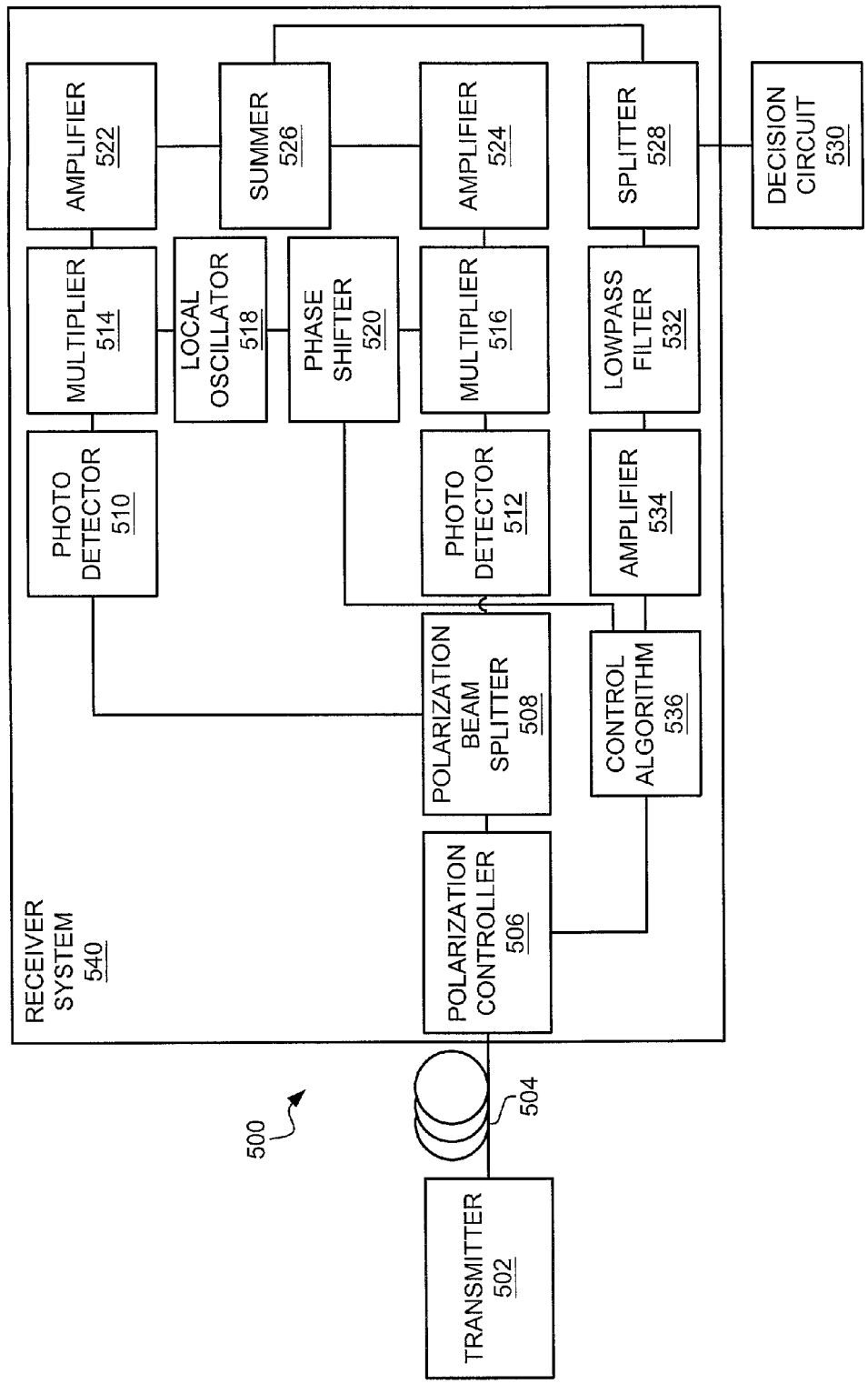
FIG. 5 is a block diagram of a communication system with a receiver system for coherent detection in an example of the invention.

FIG. 5 depicts a block diagram of a communication system 500 with a receiver system 540 for coherent detection in an example of the invention. The receiver system 540 performs coherent detection based on use of the local oscillator 518. The communication system 500 includes a transmitter 502, an optic fiber link 504, a receiver system 540, and a decision circuit 530. The receiver system 540 includes a polarization controller 506, a polarization beam splitter 508, a photodetector 510, a photodetector 512, a multiplier 514, a multiplier 516, a local oscillator 518, a phase shifter 520, an amplifier 522, an amplifier 524, a summer 526, a splitter 528, a lowpass filter 532, an amplifier 534, and a control algorithm 536.

The transmitter 502 is connected to the polarization controller 506 via the optic fiber link 504. The polarization controller 506 is connected to the polarization beam splitter 508 and the control algorithm 536. The polarization beam splitter 508 is connected to the photodetector 510 and the photodetector 512. The photodetector 510 is connected to the multiplier 514. The multiplier 510 is connected to the amplifier 522 and the local oscillator 518. The local oscillator 518 is connected to the phase shifter 520. The phase shifter 520 is connected to the multiplier 516 and the control algorithm 536. The multiplier 516 is connected to the photodector 512 and the amplifier 524. The summer 526 is connected to the amplifier 522, the amplifier 524, and the splitter 528. The splitter 528 is connected the decision circuit 530 and the lowpass filter 532. The low pass filter 532 is connected to the amplifier 534. The amplifier 534 is connected to the control algorithm 536.

The operation of the communication system 500 is similar to the operation of the communication system 400 of FIG. 4 except for the following operations. The entire operation of communication system 500 is not discussed for the sake of brevity and similarity to the communication system 400.

In this embodiment, the communication system 500 uses SCM signals. In this embodiment, the local oscillator 518 is an RF oscillator synchronized to the sub-carrier. The multiplier 514 multiplies the first electric signal from the photodetector 510 and the signal from the local oscillator 518 to perform RF demultiplexing. The phase shifter 520 shifts the phase of the signal from the local oscillator 518 based on control instructions from the control algorithm. The phase shifter 520 is a controllable phase shifter. The shift in phase is to compensate for the PMD. In this embodiment, the control instructions indicate the amount of phase to shift based on the DGD, which is determined by the control algorithm 536. The multiplier 516 then multiplies the second electric signal from the photodetector 512 and the signal with the phase shift from the phase shifter 520 to perform RF demultiplexing. The amplifier 522 amplifies the first electrical signal. The amplifier 524 amplifies the second electrical signal. The summer 526 then sums the first electrical signal and the second electrical signal. This embodiment of RF coherent detection is advantageous for communication system that use phase shift keying (PSK) for modulation of the signals. Some examples of phase shift keying are binary phase shift key (BPSK) and quaternary phase shift keying (QPSK).

Figure 6:
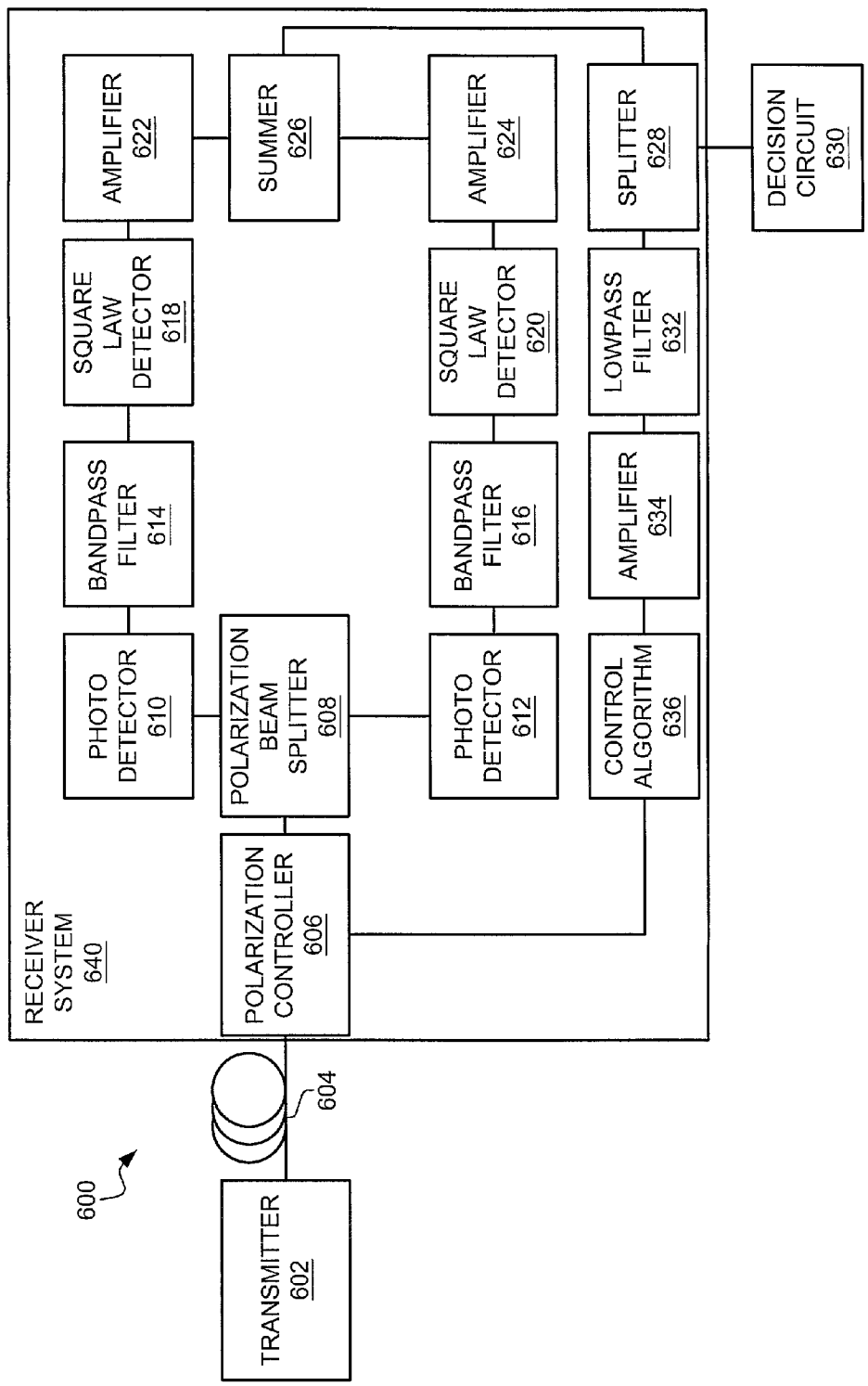
FIG. 6 is a block diagram of a communication system with a receiver system for incoherent detection in an example of the invention.

FIG. 6 depicts a block diagram of a communication system 600 with a receiver system 640 for incoherent detection in an example of the invention. The communication system 600 includes a transmitter 602, an optic fiber link 604, a receiver system 640, and a decision circuit 630. The receiver system 640 includes a polarization controller 606, a polarization beam splitter 608, a photodetector 610, a photodetector 612, a bandpass filter 614, a bandpass filter 616, a square law detector 618, a square law detector 620, an amplifier 622, an amplifier 624, a summer 626, a splitter 628, a lowpass filter 632, an amplifier 634, and a control algorithm 636.

The transmitter 602 is connected to the polarization controller 606 via the optic fiber link 604. The polarization controller 606 is connected to the polarization beam splitter 608 and the control algorithm 636. The polarization beam splitter 608 is connected to the photodetector 610 and the photodetector 612. The photodetector 610 is connected to the bandpass filter 614. The bandpass filter 614 is connected to the square law detector 618. The square law detector 618 is connected to the amplifier 622. The amplifier 622 is connected to the summer 626. The photodetector 612 is connected to the bandpass filter 616. The bandpass filter 616 is connected to the square law detector 620. The square law detector 620 is connected to the amplifier 624. The amplifier 624 is connected to the summer 626. The summer 626 is connected to the splitter 628. The splitter 628 is connected the decision circuit 630 and the lowpass filter 632. The low pass filter 632 is connected to the amplifier 634. The amplifier 634 is connected to the control algorithm 636.

The operation of the communication system 600 is similar to the operation of the communication system 400 of FIG. 4 except for the following operations. The entire operation of communication system 600 is not discussed for the sake of brevity and similarity to the communication system 400.

In this embodiment of incoherent detection or direct amplitude detection, the communication system 600 uses an amplitude shift key (ASK) modulation with SCM signals. The bandpass filter 614 filters the first electrical signal from the photodetector 610 to select the desired sub-carrier. The square law detector 618 then performs square law detection to recover the baseband data from the RF carrier in the first electrical signal. The amplifier 622 then amplifies the first electrical signal. The bandpass filter 616 filters the second electrical signal from the photodetector 612 to select the desired sub-carrier. The square law detector 620 then performs square law detection to recover the baseband data from the RF carrier in the second electrical signal. The amplifier 624 then amplifies the second electrical signal. The summer 626 then sums the first electrical signal and the second electrical signal. In this embodiment, no feedback from the control algorithm 636 is needed for any of the components performing RF detection.

Figure 7:
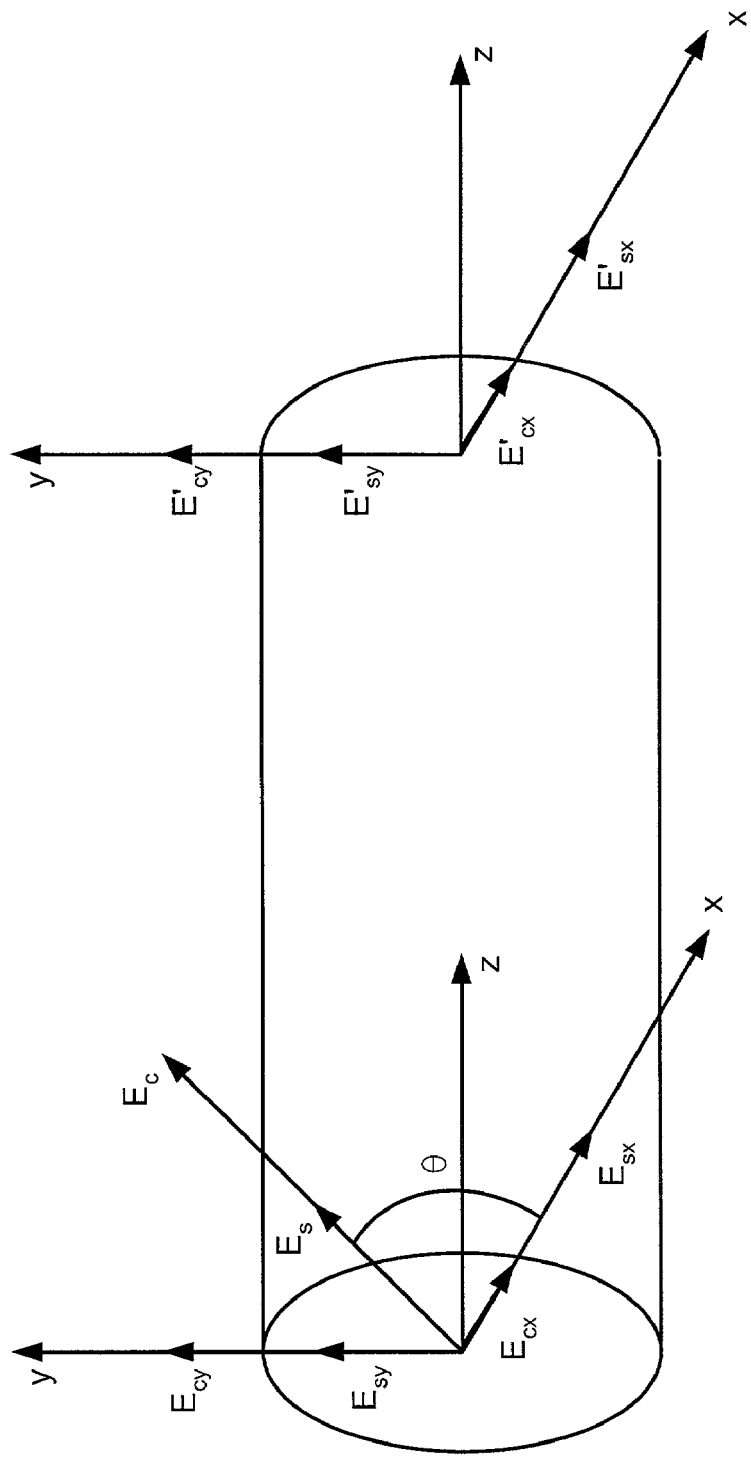
FIG. 7 is an illustration of a decomposition of an optical field in an example of the invention.

FIG. 7 depicts an illustration of a decomposition of an optical field in an example of the invention. The optical field is decomposed onto the two PSPs of the optical fiber, which are marked x and y. $E_C$ is the input optical field for the carrier in an SCM optical signal. $E_S$ is the input optical field for the sub-carrier in an SCM optical signal. Suppose the input optical fields, $E_C$ and $E_S$, are both linearly polarized for simplicity, they can be decomposed into the orthogonal PSPs of the optical fiber as stated in the following equations:

$$E_{CY}(t)=E_C(t)\cos\theta$$

$$E_{SY}(t)=E_S(t)\cos\theta$$

$$E_{CX}(t)=E_C(t)\sin\theta$$

$$E_{SX}(t)=E_S(t)\sin\theta$$

where θ is the reference polarization angle.

$E_{CX}$, $E_{SX}$, $E_{CY}$, and $E_{SY}$ travel at the corresponding PSPs to the end of the optical fiber. Neglecting the common-mode propagation delay, the effect of first order PMD is shown in the following equations as a relative time delay:

$$E'_{CY}(t)=E_{CY}(t-\Delta\tau)$$

$$E'_{SY}(t)=E_{SY}(t-\Delta\tau)$$

$$E'_{CX}(t)=E_{CX}(t-\Delta\tau)$$

$$E'_{SX}(t)=E_{SX}(t-\Delta\tau)$$

This equation should be:

$$E'_{CY}=E_{CY}(t-\Delta\tau)$$

$$E'_{SY}=E_{SY}(t-\Delta\tau)$$

$$E'_{CX}=E_{CX}(t-\Delta\tau)$$

$$E'_{SX}=E_{SX}(t-\Delta\tau)$$

where Δτ=the relative time delay between the two PSPs due to PMD. After the polarization controller aligns the principal axis of the polarization beam splitter with the output PSPs of the optical fiber, the optical fields carried by the two PSPs in the x and y directions are then separated and detected individually by two photodiodes. The photodiodes that pick up the optical signal from the PSP in the x and y direction respectively generate a signal photocurrent from the beating between the carrier and sub-carrier. This signal photocurrents in the x and y direction are recited in the following equations:

$$I_X(t)=\eta E_C(t)\sin(\theta)\cdot=E_S\sin(\theta)=E_C(t)\cdot E_S\sin^2(\theta)$$

$$I_Y(t)=\eta E_C(t-\Delta\tau)\cos(\theta)\cdot E_S(t-\Delta\tau)\cos(\theta)=\eta E_C(t-\Delta\tau)\cdot E_S(t-\Delta\tau)\cos^2(\theta)$$

where η is the efficiency of photo detection. In SCM as the beating occurs between the carrier and sub-carrier, the following equation is true for photocurrent detected by each photodiode:

$$E_C(t)E_S(t)\propto P\cos(\Omega t) \text{ and } E_C(t-\Delta\tau)E_S(t-\Delta\tau)\propto P\cos[\Omega(t-\Delta\tau)]$$

where Ω is the subcarrier frequency.

If these two photocurrent components are directly combined, complete signal fading happens when Δτ=π/Ω. In this case, to avoid signal fading from happening, fiber DGD has to be very small, especially when the subcarrier frequency is high. Using RF detection before combining them, the high frequency RF subcarrier at Ω is removed, therefore, system tolerance to fiber PMD depends only on the baseband data rate carried by each subcarrier and thus is much relaxed.

What is claimed is:

1. A method of processing a received optical signal from an optic fiber, the received optical signal carrying user information, the method comprising:
   splitting by way of a splitter the received optical signal based on polarization into a fist optical signal and a second optical signal;
   converting the first optical signal into a corresponding first electrical signal;
   converting the second optical signal into a corresponding second electrical signal;
   applying radio frequency detection to the first electrical signal to generate a third electrical signal;
   applying radio frequency detection to the second electrical signal to generate a fourth electrical signal;

combining the third electrical signal and the fourth electrical signal to form a fifth electrical signal that carries the user information;

low-pass-filtering the fifth electrical signal to generate a filtered fifth electrical signal;

amplifying the filtered fifth electrical signal to generate an amplified fifth electrical signal; and processing the amplified fifth electrical signal to align polarizations of the received optical signal with a principal axis of the splitter;

wherein the first optical signal and the second optical signal are aligned with the principal states of polarization of the optic fiber.

2. The method of claim 1 wherein processing the amplified fifth electrical signal is performed by way of a control algorithm to generate control instructions to align the polarizations of the received optical signal with the principal axis of the splitter.

3. The method of claim 1 wherein applying radio frequency detection to the first electrical signal to generate the third electrical signal further comprises:

generating a sixth electrical signal; and mixing the sixth electrical signal with the first electrical signal.

4. The method of claim 3 wherein applying radio frequency detection to the second electrical signal to generate the fourth electrical signal further comprises:

shifting a phase of the sixth electrical signal; and mixing the sixth electrical signal with the second electrical signal.

5. The method of claim 1 wherein applying radio frequency detection to the first electrical signal to generate the third electrical signal further comprises:

applying a band pass filter to the first electrical signal; and applying a square law detector to the first electrical signal.

6. The method of claim 1 wherein applying radio frequency detection to the second electrical signal to generate the fourth electrical signal further comprises;

applying a bandpass filter to the second electrical signal; and applying a square law detector to the second electrical signal.

7. The method of claim 1 wherein the received optical signal is sub-carrier modulated.

8. A receiver system for processing a received optical signal from an optic fiber, the received optical signal carrying user information, the receiver system comprising:

a splitter configured to split the received optical signal based on polarization into a first optical signal and a second optical signal;

a polarization controller connected to the splitter and configured to align polarizations of the received optical signal with a principal axis of the splitter;

a first converter connected to the splitter and configured to convert the first optical signal into a corresponding first electrical signal;

a second converter connected to the splitter and configured to convert the second optical signal into a corresponding second electrical signal;

a detection system connected to the first converter and the second converter and configured to apply radio frequency detection to the first electrical signal to generate a third electrical signal, apply radio frequency detection to the second electrical signal to generate a fourth electrical signal, and combine the third electrical signal and the fourth electrical signal to form a fifth electrical signal that caries the user information; and a feedback loop coupled with the detection system to low-pass-filter the fifth electrical signal to generate a filtered fifth electrical signal, amplify the filtered fifth electrical signal to generate an amplified fifth electrical signal, and process the amplified fifth electrical signal to control the polarization controller:

wherein the first optical signal and the second optical signal are aligned with the principal states of polarization of the optic fiber.

9. The receiver system of claim 8 wherein the polarization controller is configured to align the polarizations of the received optical signal based on control instructions from a control algorithm of the feedback loop that processes the amplified fifth electrical signal.

10. The receiver system of claim 8 wherein the detection system is configured to generate a sixth electrical signal and mix the sixth electrical signal with the first electrical signal.

11. The receiver system of claim 10 wherein the detection system is configured to shift a phase of the sixth electrical signal and mix the sixth electrical signal with the second electrical signal.

12. The receiver system of claim 8 wherein the detection system is configured to apply a bandpass filter to the first electrical signal and apply a square law detector to the first electrical signal.

13. The receiver system of claim 8 wherein the detection system is configured to apply a bandpass filter to the second electrical signal and apply a square law detector to the second electrical signal.

14. The receiver system of claim 8 wherein the received optical signal is sub-carrier modulated.

* * * * *